United States Patent
Abe et al.

(10) Patent No.: US 7,561,158 B2
(45) Date of Patent: Jul. 14, 2009

(54) METHOD AND APPARATUS FOR PRESENTING FEATURE IMPORTANCE IN PREDICTIVE MODELING

(75) Inventors: Naoki Abe, Rye, NY (US); Edwin Peter Dawson Pednault, Cortlandt Manor, NY (US); Fateh Ali Tipu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 11/329,437

(22) Filed: Jan. 11, 2006

(65) Prior Publication Data

US 2007/0159481 A1  Jul. 12, 2007

(51) Int. Cl.
    *G06T 11/20* (2006.01)
(52) U.S. Cl. .................................... 345/440; 706/12
(58) Field of Classification Search ............... 345/440; 706/12
    See application file for complete search history.

(56) References Cited

U.S. PATENT DOCUMENTS

| | | | | |
|---|---|---|---|---|
| 5,884,037 | A * | 3/1999 | Aras et al. | 709/226 |
| 6,523,015 | B1 * | 2/2003 | Bera et al. | 706/12 |
| 6,728,690 | B1 * | 4/2004 | Meek et al. | 706/25 |
| 6,810,368 | B1 * | 10/2004 | Pednault | 703/2 |
| 7,072,841 | B1 * | 7/2006 | Pednault | 705/4 |
| 2002/0099678 | A1 * | 7/2002 | Albright et al. | 706/45 |
| 2003/0004902 | A1 * | 1/2003 | Yamanishi et al. | 706/1 |
| 2003/0176931 | A1 * | 9/2003 | Pednault et al. | 700/31 |
| 2003/0220777 | A1 * | 11/2003 | Kitchen et al. | 703/11 |
| 2004/0015386 | A1 * | 1/2004 | Abe et al. | 705/10 |
| 2004/0017575 | A1 * | 1/2004 | Balasubramanian et al. | 356/625 |
| 2004/0078171 | A1 * | 4/2004 | Wegerich et al. | 702/188 |
| 2004/0215587 | A1 * | 10/2004 | Bertrand et al. | 706/59 |
| 2005/0091267 | A1 * | 4/2005 | Zhang et al. | 707/103 R |
| 2005/0197806 | A1 * | 9/2005 | Eryurek et al. | 702/188 |
| 2005/0289089 | A1 * | 12/2005 | Abe et al. | 706/12 |
| 2006/0225048 | A1 * | 10/2006 | Jakubiak | 717/127 |
| 2007/0040852 | A1 * | 2/2007 | Opsal et al. | 345/630 |
| 2007/0143851 | A1 * | 6/2007 | Nicodemus et al. | 726/25 |

* cited by examiner

*Primary Examiner*—Javid A Amini
(74) *Attorney, Agent, or Firm*—Whitham, Curtis, Christofferson & Cook, PC; Stephen C. Kaufman

(57) ABSTRACT

Feature importance information available in a predictive model with correlation information among the variables is presented to facilitate more flexible choices of actions by business managers. The displayed feature importance information combines feature importance information available in a predictive model with correlational information among the variables. The displayed feature importance information may be presented as a network structure among the variables as a graph, and regression coefficients of the variables indicated on the corresponding nodes in the graph. To generate the display, a regression engine is called on a set of training data that outputs importance measures for the explanatory variables for predicting the target variable. A graphical model structural learning module is called that outputs a graph on the explanatory variables of the above regression problem representing the correlational structure among them. The feature importance measure, output by the regression engine, is displayed for each node in the graph, as an attribute, such as color, size, texture, etc, of that node in the graph output by the graphical model structural learning module.

15 Claims, 8 Drawing Sheets

METHOD AND APPARATUS FOR PRESENTING FEATURE IMPORTANCE IN PREDICTIVE MODELING

BACKGROUND OF THE INVENTION

1. Field of the Invention

The present invention generally relates to predictive modeling for optimizing a business objective and, more particularly, to presentation of feature importance information available in a predictive model with correlation information among the variables.

2. Background Description

There is an increasing interest in the use of predictive modeling as a means to provide information on levers, drivers, and/or triggers to control in order to optimize some objective in a business optimization problem. For example, in trigger-based marketing, profit modeling provides key drivers in terms of customer behavior and marketing actions. In customer lifetime value management, lifetime value modeling provides key drivers in terms of customer behavior and marketing actions. In price optimization, demand forecasting provides key drivers in terms of pricing strategy, product features, etc. In corporate performance management, performance indicator modeling provides key drivers in terms of operational performance metrics and on-demand indices.

There are, however, problems with the use of predictive modeling as a means to provide feature importance. In many real world applications of predictive modeling, the user is interested in finding out features that are key "drivers" or "triggers" that are likely to affect the outcome (or the target). Current practice is to present feature information available in the estimated models (e.g., regression coefficients in linear regression) as importance measures. There is a problem with this approach, because in predictive modeling important features can be shadowed by other features that are highly correlated with them and consequently receive low importance measures. Another problem is that some features having high importance may not be causally related to the target variable, or not easily controllable, and alternatives may need to be sought.

Hence, methods are needed that augment typical feature importance information given by a predictive model to facilitate more flexible choices of actions.

SUMMARY OF THE INVENTION

It is therefore an object of the present invention to provide a method and apparatus which presents feature importance information given by a predictive model to facilitate more flexible choices of actions by business managers.

According to the present invention, there is provided a method and apparatus which provides feature importance information that combines feature importance information available in a predictive model (e.g., the variable coefficients in a linear regression model) with correlational information among the variables. For example, feature importance information may be presented a (special case of) Bayesian network structure among the variables as a graph, and regression coefficients of the variables indicated on the corresponding nodes in the graph.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
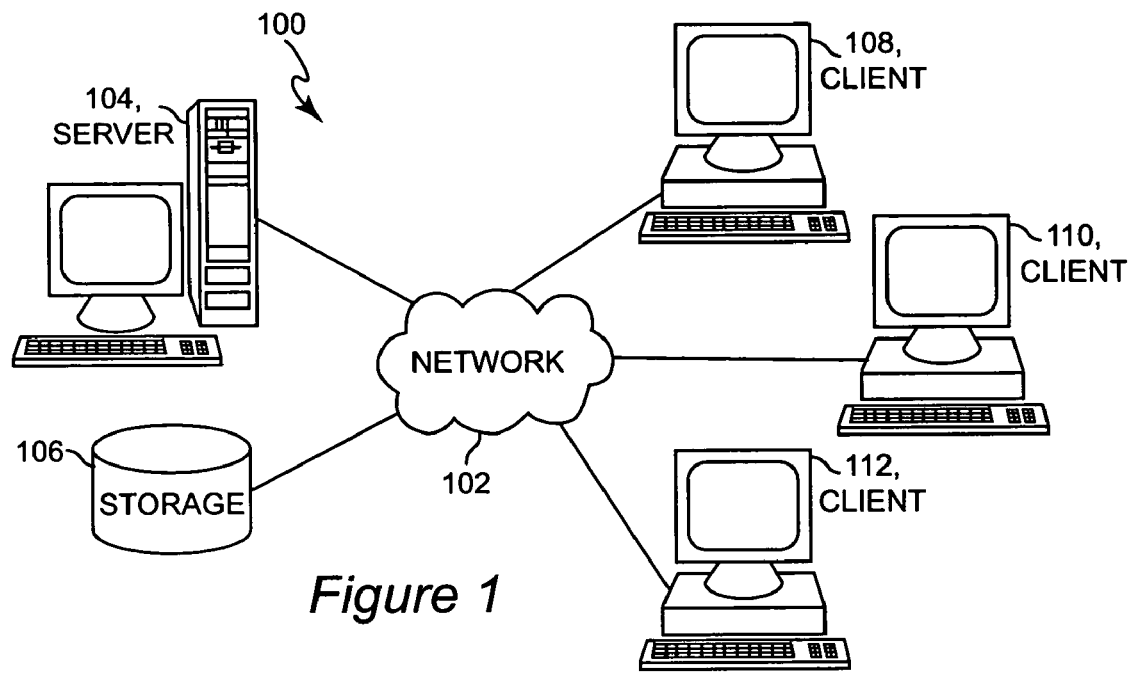
FIG. 1 is a block diagram of a computer system on which the method according to the invention may be implemented.

Referring now to the drawings, and more particularly to FIG. 1, there is shown a computer system on which the method according to the invention may be implemented. Computer system 100 contains a network 102, which is the medium used to provide communications links between various devices and computers connected together within computer system 100. Network 102 may include permanent connections, such as wire or fiber optic cables, wireless connections, such as wireless Local Area Network (WLAN) products based on the IEEE 802.11 specification (also known as Wi-Fi), and/or temporary connections made through telephone, cable or satellite connections, and may include a Wide Area Network (WAN) and/or a global network, such as the Internet. A server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer, coupled to a network, which receives a program or other application from another computer coupled to the network. The server 104 provides data, such as boot files, operating system images, and applications to clients 108, 110 and 112. Clients 108, 110 and 112 are clients to server 104.

Computer system 100 may include additional servers, clients, and other devices not shown. In the depicted example, the Internet provides the network 102 connection to a worldwide collection of networks and gateways that use the TCP/IP (Transmission Control Protocol/Internet Protocol) suite of protocols to communicate with one another. At the heart of the Internet is a backbone of high-speed data communication lines between major nodes or host computers, consisting of thousands of commercial, government, educational and other computer systems that route data and messages. In this type of network, hypertext mark-up language (HTML) documents and applets are used to exchange information and facilitate commercial transactions. Hypertext transfer protocol (HTTP) is the protocol used in these examples to send data between different data processing systems. Of course, computer system 100 also may be implemented as a number of different types of networks such as, for example, an intranet, a local area network (LAN), or a wide area network (WAN). FIG. 1 is intended as an example, and not as an architectural limitation for the present invention.

Figure 2:
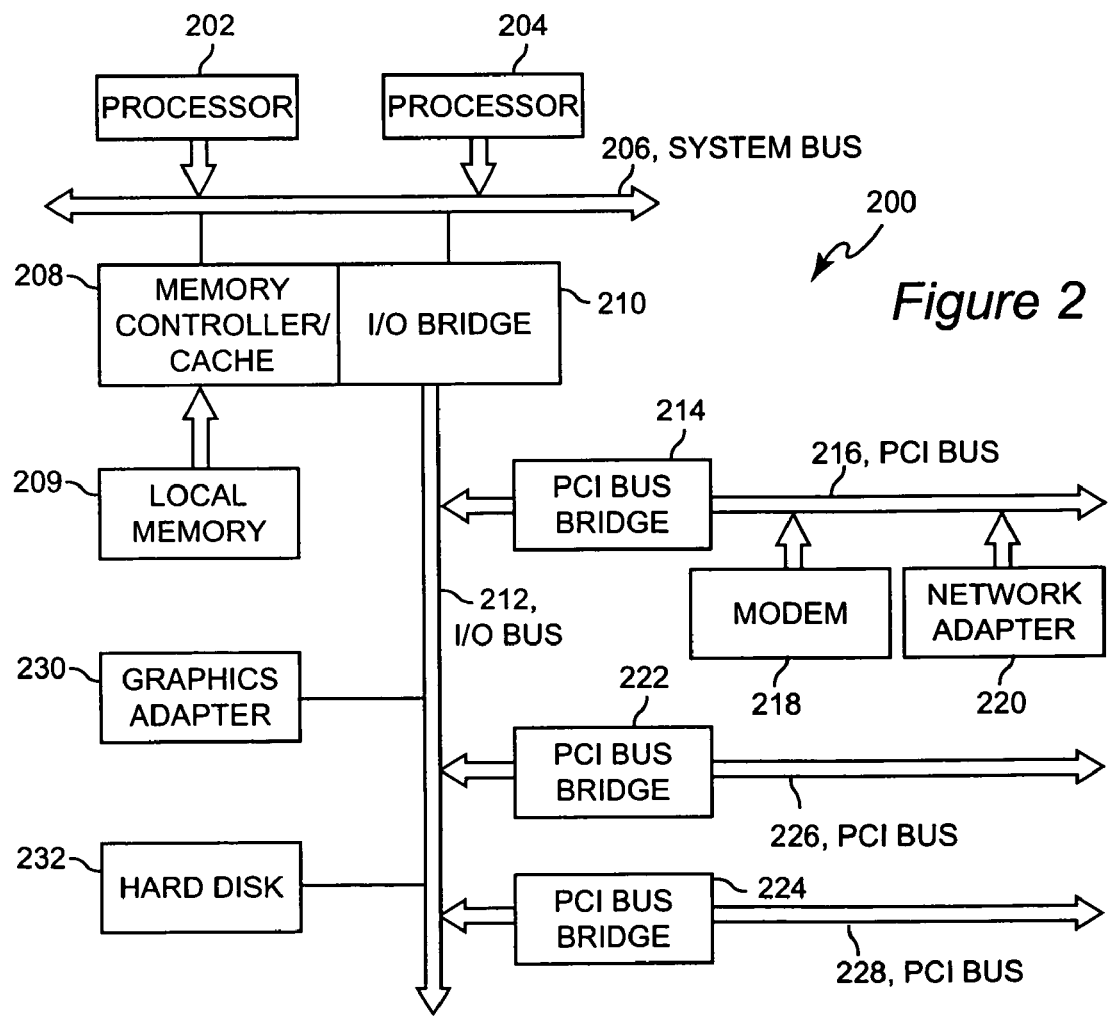
FIG. 2 is a block diagram of a server used in the computer system shown in FIG. 1.

Referring to FIG. 2, a block diagram of a data processing system that may be implemented as a server, such as server 104 in FIG. 1, is depicted in accordance with a preferred embodiment of the present invention. Server 200 may be used to execute any of a variety of business processes. Server 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
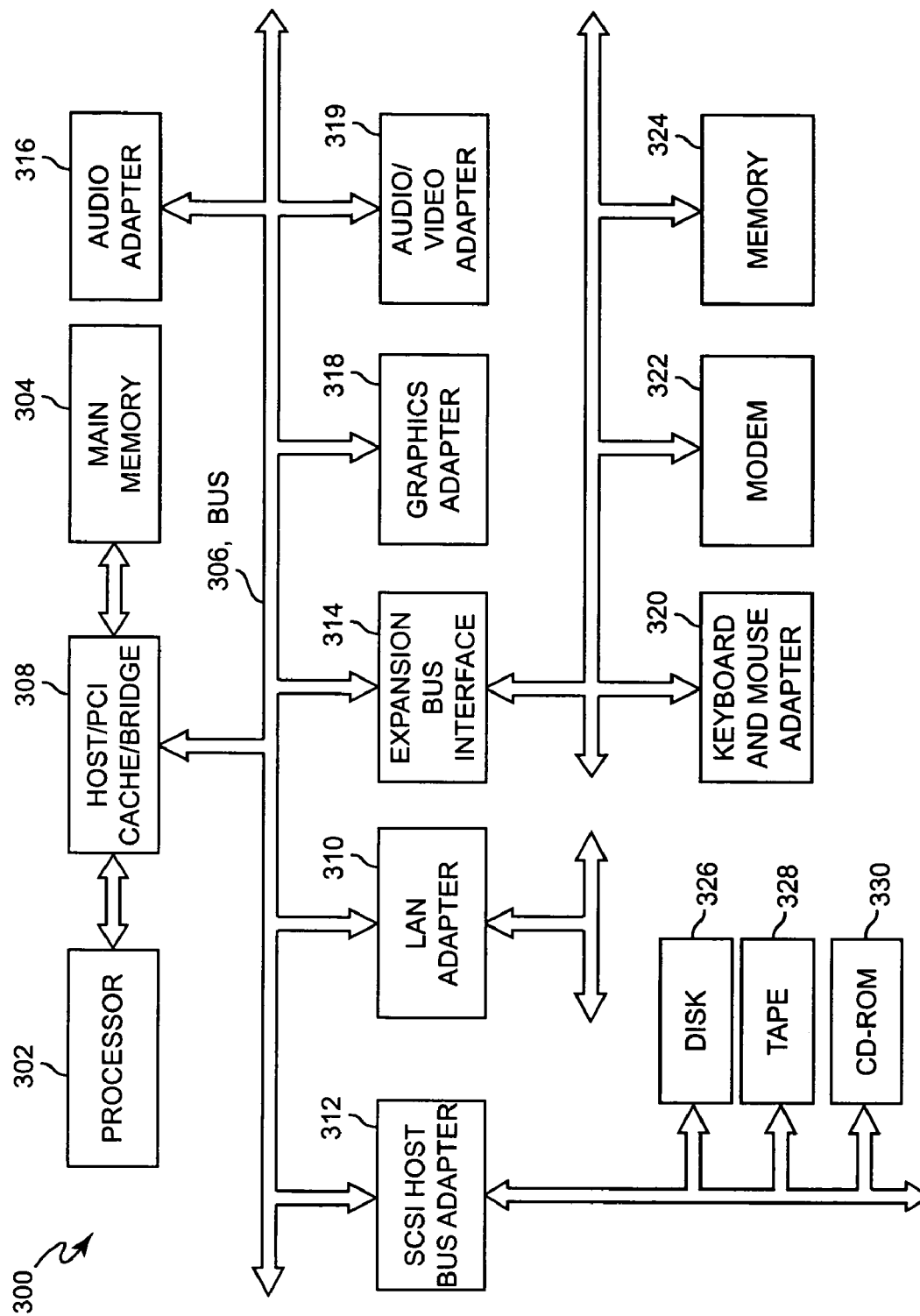
FIG. 3 is a block diagram of a client used in the computer system shown in FIG. 1.

With reference now to FIG. 3, a block diagram illustrating a client computer is depicted in accordance with a preferred embodiment of the present invention. Client computer 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, and/or I/O devices, such as Universal Serial Bus (USB) and IEEE 1394 devices, may be used in addition to or in place of the hardware depicted in FIG. 3. Also, the processes of the present invention may be applied to a multiprocessor data processing system.

Data processing system 300 may take various forms, such as a stand alone computer or a networked computer. The depicted example in FIG. 3 and above-described examples are not meant to imply architectural limitations.

Figure 4:
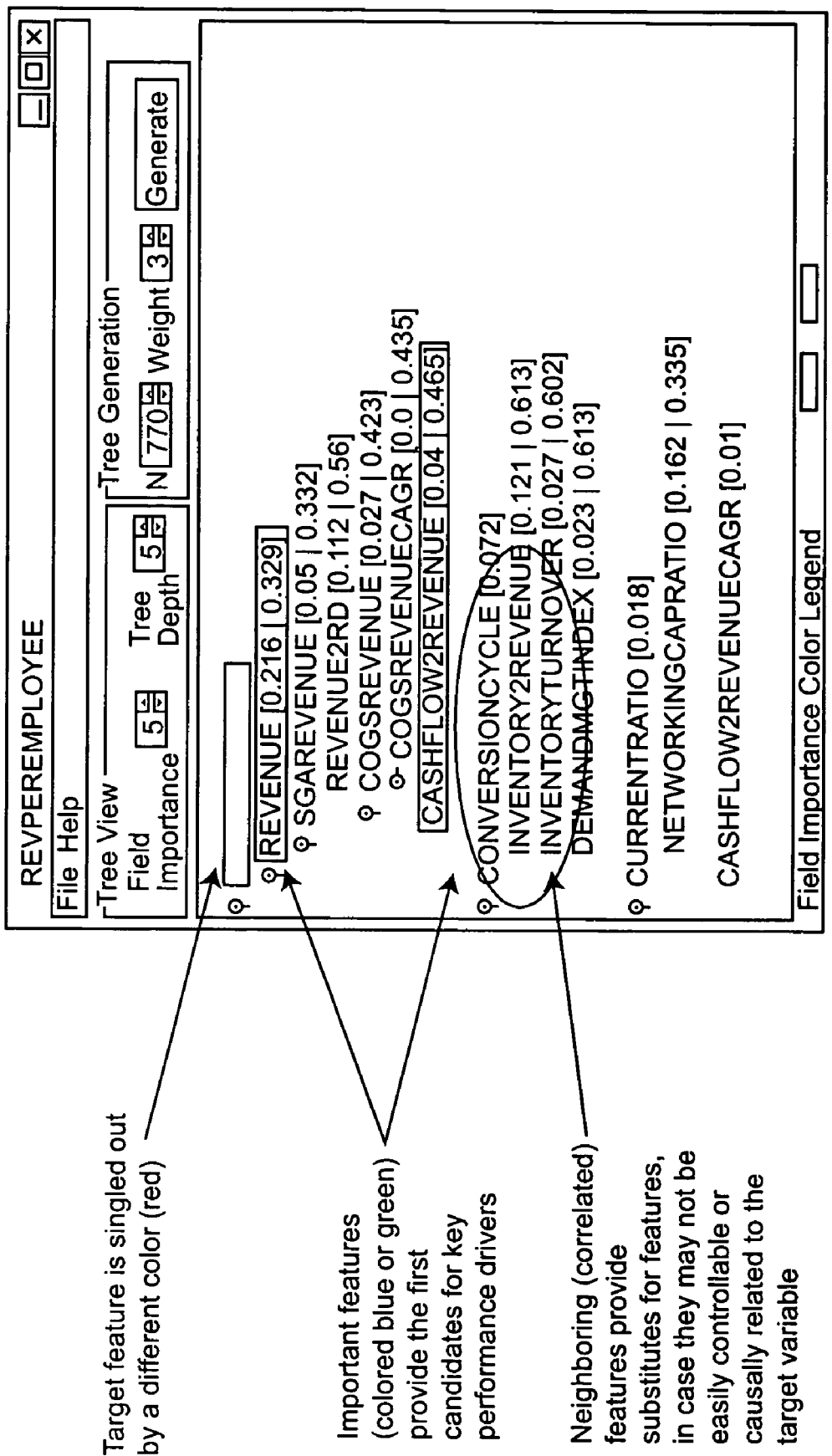
FIG. 4 is a screen print with legends illustrating an implementation example in the form of a feature importance and dependency trees.

FIG. 4 is a screen print showing an example output of applying the method according to the present invention. The method would be implemented on the system shown in FIG. 1, and the screen print of FIG. 4 would be displayed, for example, on one of the client displays. The screen print of FIG. 4 is the output, in particular, for the modeling of "Revenue per employee" as the target variable. In this output tree, we see for example that the on-demand metric "Inventory to Revenue" is identified as one of the key "drivers" for the target financial metric "Revenue per employee", but "Demand Management Index" was not. But with "Demand Management Index" having a high correlation with "Inventory to Revenue", it may be supposed that it, too, plays a key role in the determination of the target variable. If it is the case that "Inventory to Revenue" is hard to control, but "Demand Management Index" is conceivably easier to control, then it may make more sense to track and manage the latter than the former. This example illustrates a potential use of the dependency trees, as an additional source of information to the feature importance information output by regression modeling.

A preferred embodiment of the method of invention implemented on hardware of the type described above with respect to FIG. 1 is described below. The method can be applied in general to any method of regression modeling which outputs information on feature importance or coefficients, and a graphic model estimation method that outputs a graphical model that represents the joint probability distribution of the variables. Here, we describe our method using the particular methods of Linear Regression with possible input transformations and Dependency Trees, but those skilled in the art will recognize that the method can be applied equally well to other methods, such as stepwise linear regression, and other advanced regression methods such as the linear regression tree method, available in the ProbE regression engine, developed by IBM Research, as described by C. Apte, E. Bibelnieks, R. Natarajan, E. Pednault, F. Tipu, D. Campbell, and B. Nelson in "Segmentation-based modeling for advanced targeted marketing", *Proceedings of the Seventh ACM SIGKDD International Conference on Knowledge Discovery and Data Mining (SIGKDD)*, pages 408-413. ACM, 2001, and the Transform Regression also developed by IBM Research and described by E. Pednault in "Transform Regression and the Kolmogorov Superposition Theorem", *IBM Research Report RC*-23227, June 2004, and is now available as the regression function of DB2 Intelligent Miner Modeling, Version 8.2, as the regression method, and other forms of Bayesian network structure learning methods for the graphical model estimation method, such as those described by D. Heckerman, D. Geiger, and D. M. Chickering in "Learning Bayesian networks: The combination of knowledge and statistical data", *Machine Learning*, 20(3), pp. 197-243, 1995.

Figure 5:
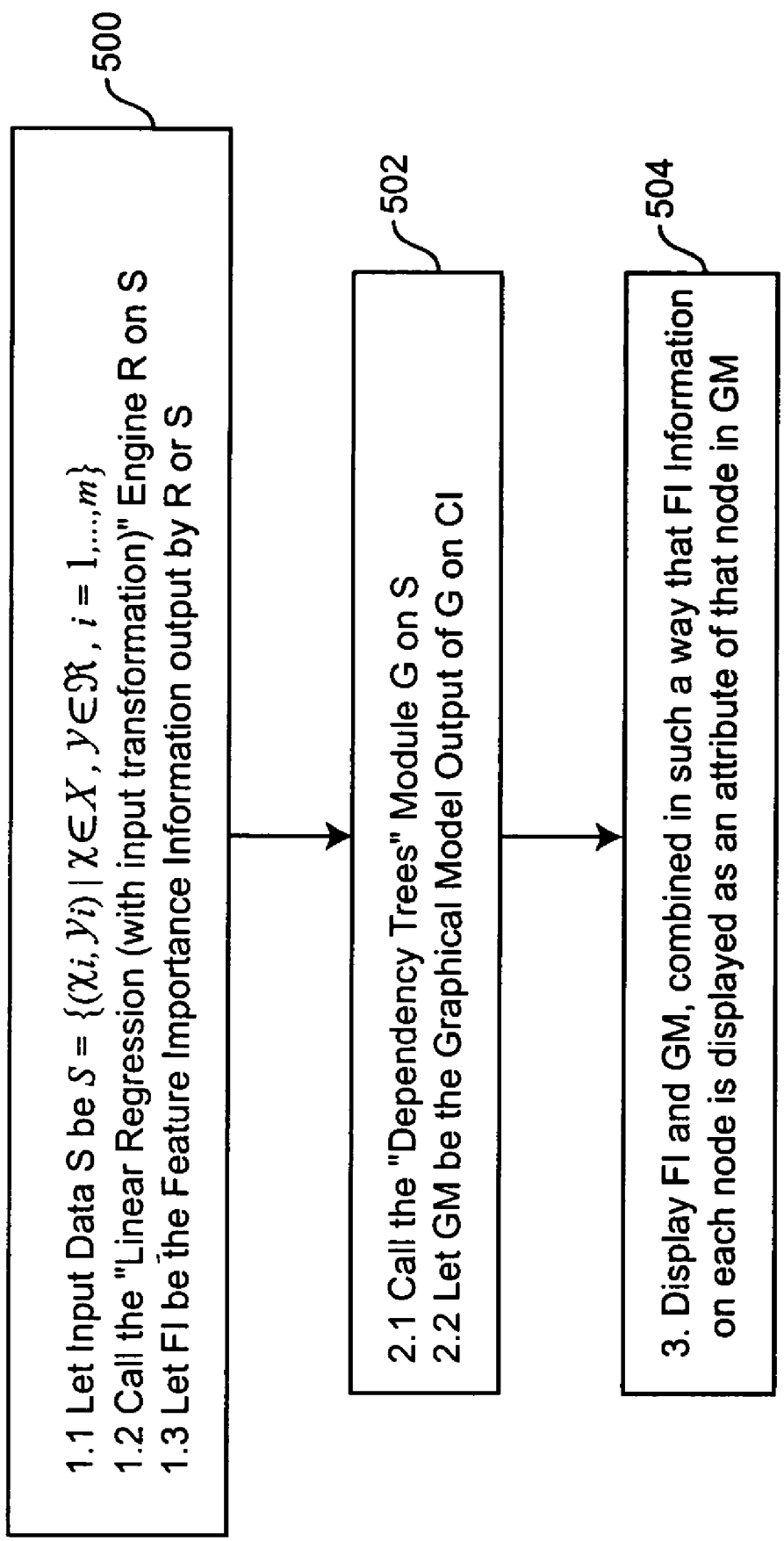
FIG. 5 is a flow diagram showing the logic of the process implemented on the computer system of FIG. 1 to produce the display shown in FIG. 4.

The preferred embodiment of the invention is shown in FIG. 5. In the first function block 500, there are three steps. Step 1.1 is to let the input data S be S={$(x_i, y_i)|x \in X, y \in \Re, i=1, \ldots, m$}. In Step 1.2, the linear regression engine R is called on input data S. In Step 1.3, FI is defined as the Feature Importance information output by linear regression engine R on input data S. In the second function block 502, there are two steps. Step 2.1 calls the dependency trees module G on the data S. In Step 2.2, GM is defined as the Graphical Model output of module G on CI, the Correlation Information output by linear regression engine R on the input data S. Finally, in function block 504, the Feature Importance (FI) information and the Graphical Model (GM) output are displayed. This information is combined in such a way that FI information on each node is displayed as an attribute of that node in the GM output, FIG. 4 being a specific example of this type of display.

Computer code which implements the function blocks shown in FIG. 5, and elsewhere in the application is stored on a computer readable medium.

Linear Regression with Input Transformation

The Linear Regression algorithm is one of the most well-known and standard methods of predictive modeling. The linear regression method is based on the idea of approximating the target real valued function as a linear function of the input, explanatory, variables. That is, if the explanatory variables are $x_1$ through $x_n$, and the target variable is y, then linear regression outputs a linear model of the following form that best approximates the target function:

$$y = a_0 + a_1 x_1 + \ldots + a_n x_n \quad (1)$$

The judgment of best approximation is done with respect to the minimization of the so-called squared loss using an input sample. That is, given an input sample of the form:

$$S = \{(x_1, y_1), (x_2, y_2), \ldots, (x_N, y_N)\}$$

where in general $x_i$ denotes a n-dimensional real valued vector of the form $(x_{1,1}, x_{1,2}, \ldots, x_{1,n})$, the method find the function F of the form (1), which minimizes the squared error on S, namely $$SE(F, S) = \Sigma_{i=1, \ldots, N} (F(x_i) - y_i)^2$$

Figure 6:
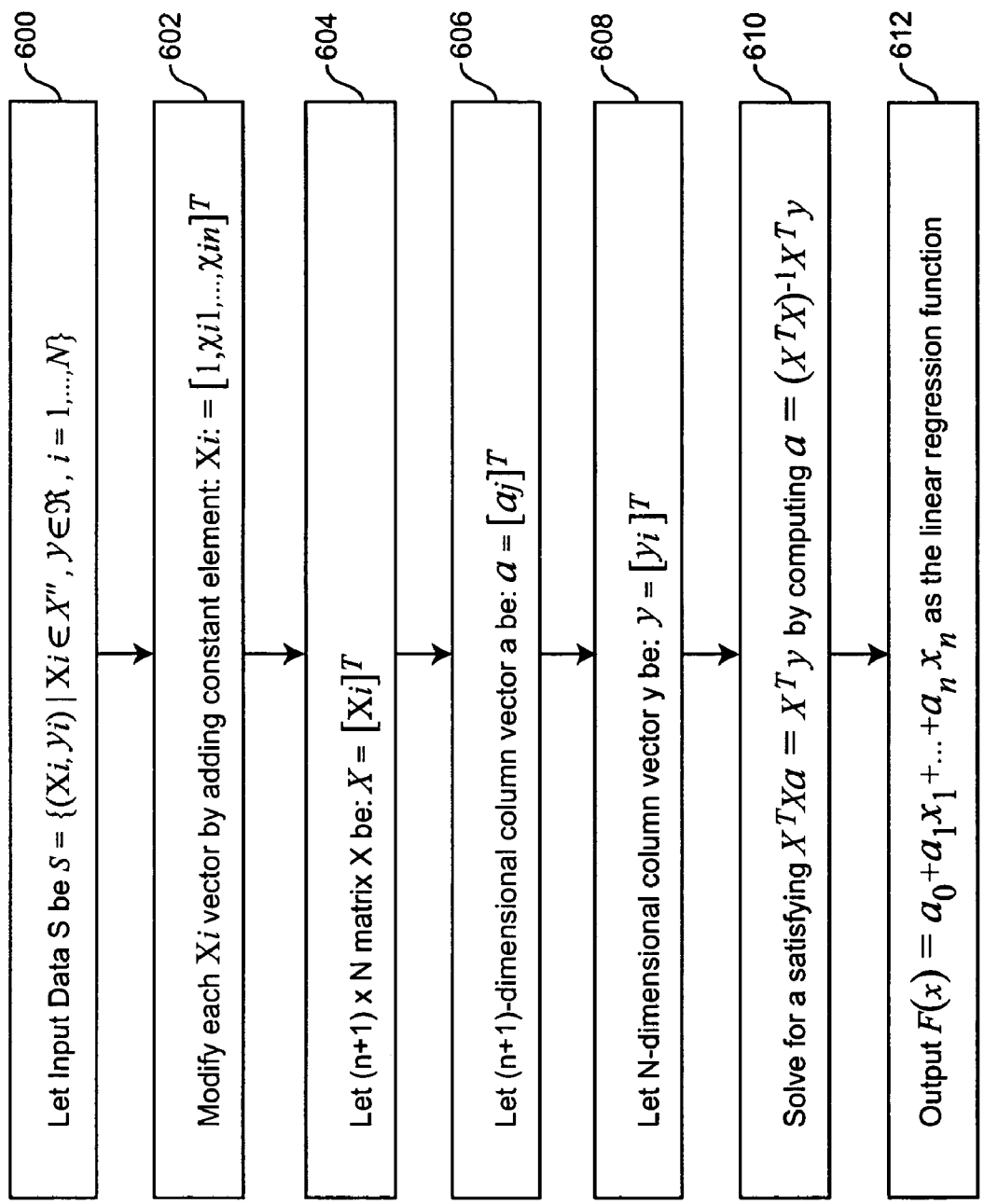
FIG. 6 is a flow diagram showing the logic of the process for the linear regression method used in step 1.2 of the process shown in FIG. 5.

The procedure for finding such a function F is illustrated in FIG. 6 as a flow chart. This procedure is performed at step 1.2 of function block 500 in FIG. 5.

With reference to FIG. 6, the procedure begins at input box 600 where the input data is set to S={$(x_i, y_i)|x_i \in X^n, y \in \Re, i=1, \ldots, N$}. In function block 602 each $x_i$ vector is modified by adding a constant element, i.e., $x_i := [1, x_{i,1}, \ldots, x_{i,n}]^T$. Then, in function block 604, (n+1)×N matrix X is set to be X=$[x_i]^T$. In function block 606, the (n+1)-dimensional column vector a is set to be a=$[a_j]^T$. Then, in function block 608, the N-dimensional column vectory is set to be y=$[y_i]^T$. Function block 610 performs computation that solves for a satisfying $X^T X a = X^T y$ by computing $a = (X^T X)^{-1} X^T y$. The result of this computation in function block 612 is $F(x) = a_0 + a_1 x_1 + \ldots + a_n x_n$ as the linear regression function.

It is also possible to use a modified version of linear regression, where the input variables are transformed prior to the application of the linear regression procedure. Specifically, each variable is transformed via a piecewise linear regression function of the following form:

$$\begin{aligned} G(x_i) &= a_{1,0} + a_{1,i} x_i \text{ if } x_i \le b_1; \\ &= a_{2,0} + a_{2,i} x_i \text{ if } b_1 \le x_i < b_2; \\ &\ldots \\ &= a_{k,0} + a_{k,i} x_i \text{ if } b_{k-1} \le x_i < b_k \end{aligned} \quad (2)$$

Figure 7:
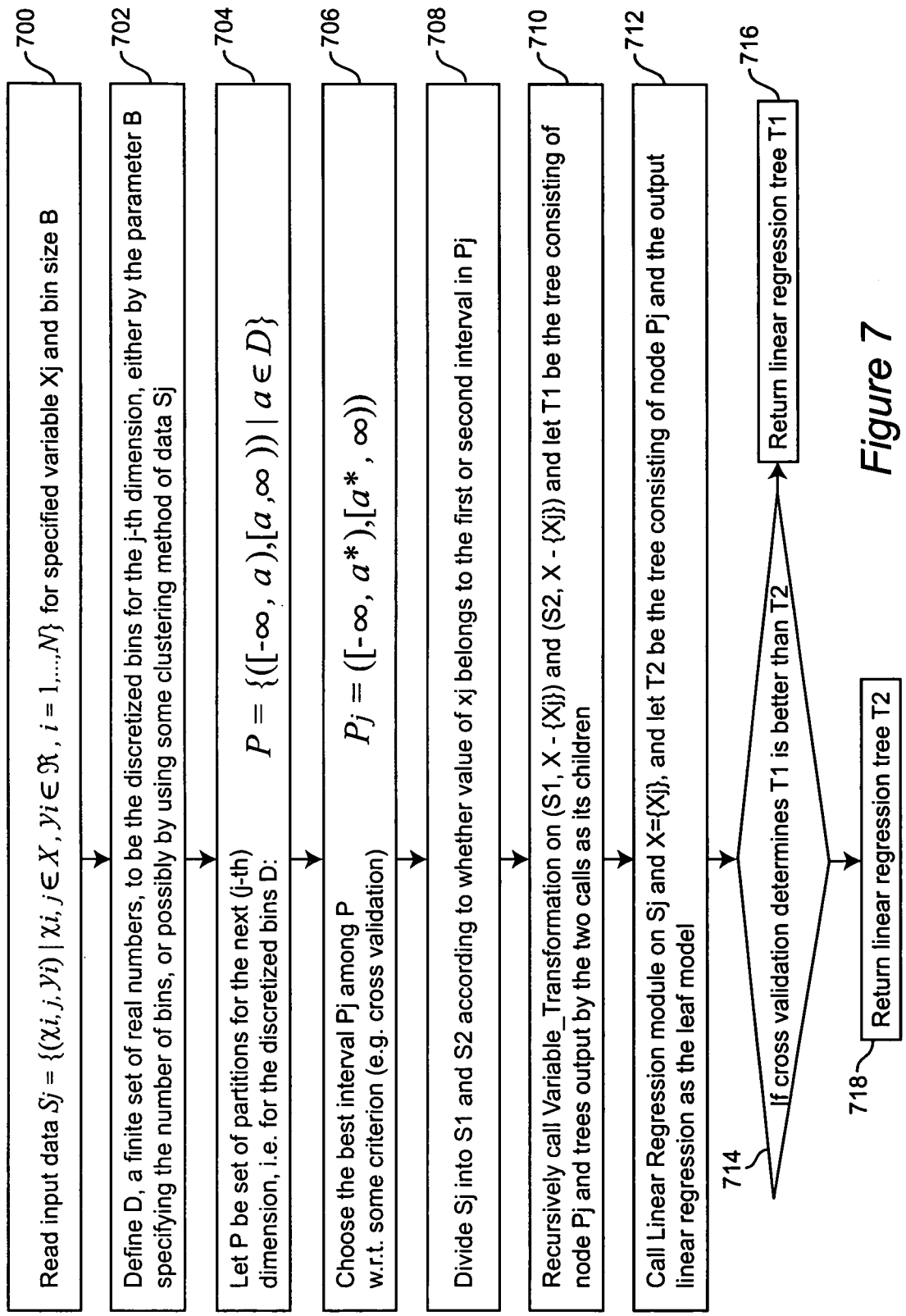
FIG. 7 is a flow diagram showing the logic of the process for the variable transformation method, which can be optionally used as an additional component of the regression method illustrated in FIG. 6.

A flow chart for the procedure for doing the above variable transformation is given in FIG. 7. This procedure can be optionally used in addition to the linear regression method of FIG. 6. The process begins in function block 700 by reading the input data S for the specified variable $X_j$ and bin size B. Next, in function block 702, D is defined as a finite set of real numbers to be the discretized bins for the j-th dimension, either by the parameter B specifying the number of bins, or possibly by using some clustering method on data $S_j$. In function block 704, P is set to be the set of partitions for the next (j-th) dimension. In other words, for the discretized bins D, P={$([-\infty, a), [a, \infty))|a \in D$}. In function block 706, the best interval $P_j$ is chosen among P based on some criterion, as for example, cross validation. In function block 708, data set $S_j$ is divided into data sets $S_1$ and $S_2$ according to whether the value of $x_j$ belongs to the first or second interval in $P_j$. The variable-_transformation process is then recursively called in function block 710 on $(S_1, X \sim \{X_j\})$ and tree $T_1$ is set to be the tree consisting of node $P_j$ and trees output by the two calls as its children. In function block 712, the linear regression module is called on $S_j$ and X={$X_j$}, and tree $T_2$ is set to be the tree consisting of node $P_j$ and the output linear regression is the leaf model. A determination is made in decision block 714 as to whether cross validation determines if tree $T_1$ is better than tree $T_2$. If so, a return is made to the linear regression tree $T_1$ in function block 716; otherwise, a return is made to linear regression tree $T_2$ in function block 718.

Similarly, if some of the input variables are "categorical" variables, namely those assuming values in a finite set A, each such variable can be transformed via a piecewise constant regression function of the form:

$$\begin{aligned} G(x_i) &= a_{1,0} \text{ if } x_i \varepsilon A_1; \\ &= a_{2,0} \text{ if } x_i \varepsilon A_2; \\ &\ldots \\ &= a_{k,0} \text{ if } x_i \varepsilon A_k; \end{aligned} \quad (3)$$

where each $A_j$ is a subset of A, the set of all values that can be assumed by $x_j$.

Figure 8:
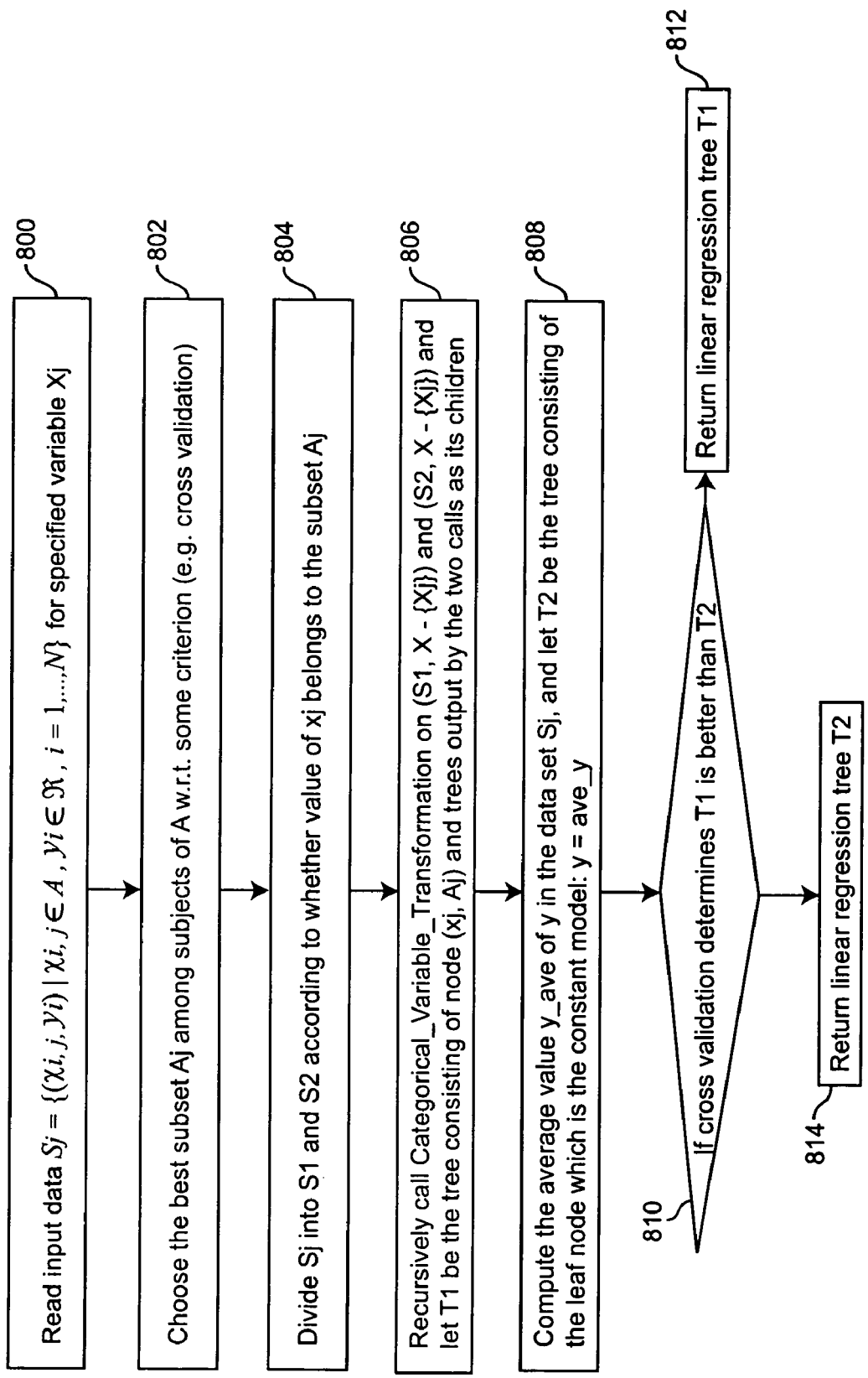
FIG. 8 is a flow diagram showing the logic of the process for the categorical variable transformation, which also can be used in addition to the linear regression method illustrated in FIG. 6.

A flow chart for this transformation is given in FIG. 8. This procedure also can be optionally used in addition to the linear regression method shown in FIG. 6. The process begins in function block 800 where the input data is read for the specified variable $X_j$. Next, in function block 802, the best subset $A_j$ among subsets of A is chosen based on some criterion, as for example, cross validation. Then, in function block 804, data set $S_j$ is divided into data sets $S_1$ and $S_2$ according to whether the value of $x_j$ belongs to the subset $A_j$. The categorical_variable_transformation procedure is recursively called on $(S_1, X-\{X_j\})$ and $(S_2, X-\{X_j\})$ in function block 806. Tree $T_1$ is set to be the tree consisting of the leaf node $(x_j, A_j)$ and the trees output by the two calls as its children. In function block 808, the average value ave_y of Y in the data set $S_j$ is computed. Tree $T_2$ is set to be the tree consisting of the leaf node which is the constant model, namely y=ave_y. A determination is made in decision block 810 as to whether $T_1$ is better than $T_2$ using cross validation. If so, a return to regression tree $T_1$ is made in function block 812; otherwise, a return is made to regression tree $T_2$ in function block 814.

These transformations can be done in a number of ways, including the use of the more general procedure of "linear regression tree", as described by C. Apte, E. Bibelnieks, R. Natarajan, E. Pednault, F. Tipu, D. Campbell, and B. Nelson in "Segmentation-based modeling for advanced targeted marketing", *Proceedings of the Seventh ACM SIGKDD International Conference on Knowledge Discovery and Data Mining (SIGKDD)*, pages 408-413. ACM, 2001. In FIG. 5, we give a flow chart describing a procedure for the variable transformation by making use of a generic procedure akin to that used in the above mentioned method for estimating linear regression trees. Here, note that a linear regression tree refers to a model representing a regression function which is defined by a tree consisting of internal nodes specifying conditions on the variables and leaf nodes consisting of linear regression models. Here, the conditions on the variables are expressed in terms of inequalities, such as those shown in the definition of $G(x_i)$ above in equation (2), and a linear regression model takes the form of equation (1).

The feature importance information can then be obtained by a number of methods, from the output of the linear regression module described above. A simple and common method is to simply output the variable coefficients of linear regression corresponding to the transformed variable, i.e., outputting $a_i$ as the feature importance for the variable/feature $x_i$ in the regression function (1) output by the linear regression method. Another possible method is to perform "variable perturbation" for each variable, using the output model. That is, each input variable is randomly varied, for example, by adding a Gaussian noise to its value, and then the feature importance score is determined by calculating how much change in the target variable is expected by the perturbation in the explanatory variable in question. To the extent that the model captures the non-linear effect of each explanatory variable via the feature transformation, the feature importance also reflects such effects. However, the importance measure of a given feature is fundamentally dependent on the particular model output by the algorithm, and hence is not free of some fundamental shortcomings common in any regression methods. For example, if two explanatory variables are highly correlated with one another, it is very likely that the regression model will include one but not the other, at least with a significant coefficient. In such a case, one of the variables will receive a high feature importance, whereas the other will be assigned a negligible feature importance. This is not a problem if the sole goal of the modeling is to "predict" the target variable, but it is a concern if the goal is to understand what variables play an important role in determining the target variable, which is what we are interested in doing here. The next tool we make use of, that of dependency trees, is intended to address this issue.

Dependency Trees

The dependency trees tool was developed in part to address the issue described above, and it is designed to work with the output model of Transform Regression. The dependency trees algorithm is based on the classic maximum likelihood estimation method for dendroids or dependency trees, as is described by C. K. Chow and C. N. Liu in "Approximating discrete probability distributions with dependence trees", *IEEE Transactions on Information Theory*, Vol. IT-14, pp. 462-467, 1968, and the corresponding estimation algorithm with respect to the Minimum Description Length Principle, which is described by J. Rissanen in "Modeling by shortest data description", *Automatica*, Vol. 14, pp. 465-471, 1978, but it has been generalized to handle continuous variables.

The dendroid, or dependency tree, is a certain restricted class of probability models for a joint distribution over a number of variables, $x_1, \ldots, x_n$, and takes the following form:

$$P(x_1, \ldots, x_n) = P(x_1) \Pi_{(x_i, x_j) \in G} P(x_i | x_j)$$

where G is a graph, which happens to be a tree, rooted at the node $x_1$. Dependency Trees are simply a finite set of dependency trees, each defined on a disjoint subset of the variables.

The algorithm, shown below, is guaranteed to find an optimal dependency trees with respect to the Minimum Description Length principle. In the description below, the algorithm is exhibited for the case of continuous Gaussian variables. Below, note that N denotes the size of the training sample. We let $I(X_i, X_j)$ denote the empirical mutual information between the two variables observed in the data, namely, $$I(X_i, X_j) = (\tfrac{1}{2})(1 + \log((\sigma_{X_i}^2 \sigma_{X_j}^2)/(\sigma_{X_i}^2 \sigma_{X_j}^2 - \sigma_{X_i, X_j}^2)))$$

Algorithm Dependency_Trees

Figure 9:
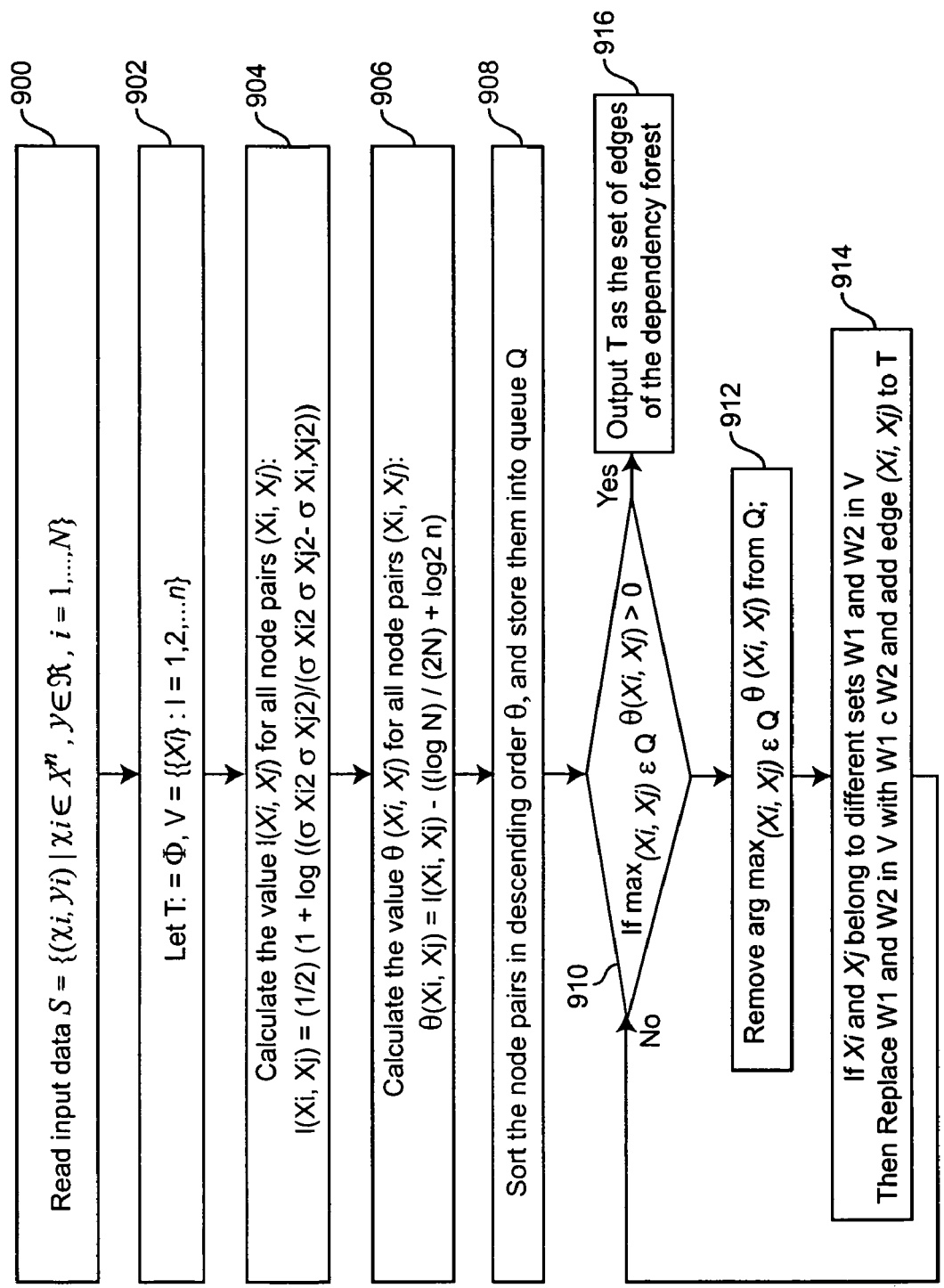
FIG. 9 is a flow diagram showing the logic of the process for the dependency trees method used in step 2.1 of the process shown in FIG. 5.

The flow diagram of the algorithm is shown in FIG. 9. The process begins by reading the input data S in function block 900. Then, in function block 902, we let $T := \Phi$, $V := \{\{X_i\} : I=1, 2, \ldots, n\}$. The value $I(X_i, X_j)$ is calculated in function block 904 for all node pairs $(X_i, X_j)$. The value $\theta(X_i, X_j)$ is calculated as $\theta(X_i, X_j) = I(X_i, X_j) - ((\log N)/(2N) + \log_2 n)$ in function block 906 for all node pairs $(X_i, X_j)$. Then, in function block 908, the node pairs are sorted in descending order of $\theta$ and stored into queue Q. A determination is made in decision block 910 as to whether $\max_{(Xi, Xj) \in Q} \theta(X_i, X_j) > 0$. If so, tree T is output as the set of edges of the dependency trees in function block 912; otherwise, $\arg \max_{(Xi, Xj) \in Q} \theta(X_i, X_j)$ is removed from queue Q in function block 914. In this case, if $X_i$ and $X_j$ belong to different sets $W_1$ and $W_2$ in V, $W_1$ and $W_2$ in V are replaced with $W_1 \cup W_2$ in V and edge $(X_i, X_j)$ is added to tree T in function block 916. Then, a return is made to decision block 910.

Application to the Preferred Embodiment

In the preferred embodiment of the method of the invention, the above "dependency trees" algorithm can be optionally applied to the transformed variables using the transforms described above, instead of the raw input variables. This step is desirable because the variable transformation described is done so as to best predict the target variable. Thus, the subsequent analysis performed by the Dependency Trees method analyzes the correlational structure among the explanatory variables, with respect to the modeling of the specified target variable. This is a desirable property of the preferred embodiment, since the latter analysis is intended to help the interpretability of the output of the former modeling, which is regression modeling of the specified target variable.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of displaying feature importance in predictive modeling comprising the steps of:
   using a computer system having network connectivity to call a regression engine on a set of training data obtained from a storage unit connected to a computer network, said regression engine performing predictive modeling on said training data and outputting importance measures for explanatory variables for predicting a target variable;
   calling a graphical model structural learning module that receives the importance measures output by the regression engine, computes correlational information among the explanatory variables, and outputs a graph on the explanatory variables and representing a feature correlation structure among said explanatory variables; and
   displaying a feature importance measure, output by the regression engine, for each node in the graph, as an attribute of a node in the graph output by the graphical model structural learning module, to combine the predictive modeling of the regression engine with the feature correlation among the explanatory variables.

2. The method of displaying feature importance in predictive modeling recited in claim 1, wherein the feature importance measure, output by the regression engine, for each node in the graph, is displayed as an attribute selected from color, size, and texture.

3. The method of displaying feature importance in predictive modeling recited in claim 1, wherein the graphical model is obtained by calling a graphical model structure learning module using as input a correlation matrix between transforms of the input explanatory variables, in which the transform of each real valued variable is obtained by way of uni-variate linear regression tree with that input variable for the target variable, whereby the input explanatory variables are transformed so as to best predict the target variable.

4. The method of displaying feature importance in predictive modeling recited in claim 1, wherein the graphical model is obtained by calling a graphical model structure learning module using as input a correlation matrix between transforms of the input explanatory variables, in which the transform of each categorical variable is obtained by way of uni-variate regression tree with that input variable for the target variable, whereby the input explanatory variables are transformed so as to best predict the target variable.

5. The method of displaying feature importance in predictive modeling recited in claim 1, wherein the graphical model is obtained by calling an estimation method for dependency trees.

6. A system for displaying feature importance in predictive modeling comprising:
   a regression engine operable on a set of training data that performs predictive modeling on the set of training data and outputs importance measures for explanatory variables for predicting a target variable;
   a graphical model structural learning module that receives the importance measures output by the regression engine, computes correlational information among the explanatory variables, and outputs a graph on the explanatory variables and represents a feature correlation structure among said explanatory variables; and
   a display for displaying a feature importance measure, output by the regression engine, for each node in the graph, as an attribute of a node in the graph output by the graphical model structural learning module, to combine the predictive modeling of the regression engine with the feature correlation among the explanatory variables.

7. The system for displaying feature importance in predictive modeling recited in claim 6, wherein the feature importance measure, output by the regression engine, for each node in the graph, is displayed by the display as an attribute selected from color, size, and texture.

8. The system for displaying feature importance in predictive modeling recited in claim 6, wherein the graphical model is obtained by calling the graphical model structure learning module using as input a correlation matrix between transforms of the input explanatory variables, in which the transform of each real valued variable is obtained by way of uni-variate linear regression tree with that input variable for the target variable, whereby the input explanatory variables are transformed so as to best predict the target variable.

9. The system for displaying feature importance in predictive modeling recited in claim 6, wherein the graphical model is obtained by calling the graphical model structure learning module using as input a correlation matrix between transforms of the input explanatory variables, in which the transform of each categorical variable is obtained by way of uni-variate regression tree with that input variable for the target variable, whereby the input explanatory variables are transformed so as to best predict the target variable.

10. The system for displaying feature importance in predictive modeling recited in claim 6, wherein the graphical model is obtained by calling an estimation method for dependency trees.

11. A storage unit having computer code implementing a method of displaying feature importance in predictive modeling, said method comprising the steps of:
    calling a regression engine on a set of training data that performs predictive modeling on the set of training data and outputs importance measures for explanatory variables for predicting a target variable;
    calling a graphical model structural learning module that receives the importance measures output by the regression engine, computes correlational information among the explanatory variables, and outputs a graph on the explanatory variables and representing a feature correlation structure among said explanatory variables; and
    displaying a feature importance measure, output by the regression engine, for each node in the graph, as an attribute of a node in the graph output by the graphical model structural learning module, to combine the predictive modeling of the regression engine with the feature correlation among the explanatory variables.

12. The storage unit recited in claim 11, wherein the feature importance measure of the method of displaying feature importance in predictive modeling, output by the regression engine, for each node in the graph, is displayed as an attribute selected from color, size, and texture.

13. The storage unit recited in claim 11, wherein the graphical model of the method of displaying feature importance in predictive modeling is obtained by calling a graphical model structure learning module using as input a correlation matrix between transforms of the input explanatory variables, in which the transform of each real valued variable is obtained by way of uni-variate linear regression tree with that input variable for the target variable, whereby the input explanatory variables are transformed so as to best predict the target variable.

14. The storage unit recited in claim 11, wherein the graphical model of the method of displaying feature importance in predictive modeling is obtained by calling a graphical model structure learning module using as input a correlation matrix between transforms of the input explanatory variables, in which the transform of each categorical variable is obtained by way of uni-variate regression tree with that input variable for the target variable, whereby the input explanatory variables are transformed so as to best predict the target variable.

15. The storage unit recited in claim 11, wherein the graphical model of the method of displaying feature importance in predictive modeling is obtained by calling an estimation method for dependency trees.

* * * * *